United States Patent
Zhang et al.

(10) Patent No.: US 10,273,435 B2
(45) Date of Patent: *Apr. 30, 2019

(54) AQUEOUS COMPOSITION SUITABLE FOR CLEANING AND PROTECTION COMPRISING SILICA NANOPARTICLES, COPOLYMER OF ACRYLAMIDE AND ACRYLIC ACID, NONIONIC AND ANIONIC SURFACTANT

(71) Applicant: 3M INNOVATIVE PROPERTIES COMPANY, St. Paul, MN (US)

(72) Inventors: Yifan Zhang, Woodbury, MN (US); Naiyong Jing, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,996

(22) Filed: Feb. 19, 2018

(65) Prior Publication Data
US 2018/0171266 A1  Jun. 21, 2018

Related U.S. Application Data

(63) Continuation of application No. 15/109,471, filed as application No. PCT/US2015/013164 on Jan. 28, 2015, now Pat. No. 9,926,518.
(Continued)

(51) Int. Cl.
*C11D 1/02* (2006.01)
*C11D 1/66* (2006.01)
(Continued)

(52) U.S. Cl.
CPC .............. *C11D 3/3769* (2013.01); *C09D 5/00* (2013.01); *C09D 7/67* (2018.01); *C09D 133/26* (2013.01);
(Continued)

(58) Field of Classification Search
CPC .... C11D 1/02; C11D 1/66; C11D 1/83; C11D 3/08; C11D 3/124; C11D 3/3719; C11D 3/3769; B08B 3/04
See application file for complete search history.

(56) References Cited

U.S. PATENT DOCUMENTS

| 4,861,511 A | 8/1989 | Kaplan |
|---|---|---|
| 6,955,834 B2 | 10/2005 | Rohrbaugh |

(Continued)

FOREIGN PATENT DOCUMENTS

| JP | 2004-263008 | 9/2004 |
|---|---|---|
| JP | 2008-024843 | 2/2008 |

(Continued)

OTHER PUBLICATIONS

Griffin, "Calculation of HLB Values of Non-Ionic Surfactants", Journal of the Society of Cosmetic Chemists, 1954, vol. 5, No. 259, pp. 249-256.
(Continued)

*Primary Examiner* — Brian P Mruk
(74) *Attorney, Agent, or Firm* — Carolyn A. Fischer (57) ABSTRACT

Compositions include a water-soluble polymer, silica nanoparticles, and a combination of a nonionic and anionic dispersed in an aqueous liquid phase. The polymer is a water-soluble copolymer of acrylic acid and an acrylamide, or a salt of the same. Methods of using the compositions to clean and coat a substrate are also disclosed.

14 Claims, 1 Drawing Sheet

Related U.S. Application Data (60) Provisional application No. 61/933,959, filed on Jan. 31, 2014.

(51) Int. Cl.

| | | |
|---|---|---|
| *C11D 1/83* | (2006.01) | |
| *C11D 3/08* | (2006.01) | |
| *C11D 3/37* | (2006.01) | |
| *B08B 3/04* | (2006.01) | |
| *C11D 3/12* | (2006.01) | |
| *C11D 3/22* | (2006.01) | |
| *C11D 11/00* | (2006.01) | |
| *C11D 17/00* | (2006.01) | |
| *C09D 133/26* | (2006.01) | |
| *C11D 1/14* | (2006.01) | |
| *C09D 5/00* | (2006.01) | |
| *C09D 7/40* | (2018.01) | |
| *C08K 3/36* | (2006.01) | |

(52) U.S. Cl.
CPC .............. *C11D 1/143* (2013.01); *C11D 1/662* (2013.01); *C11D 1/83* (2013.01); *C11D 3/124* (2013.01); *C11D 3/1246* (2013.01); *C11D 3/22* (2013.01); *C11D 3/378* (2013.01); *C11D 11/0023* (2013.01); *C11D 11/0035* (2013.01); *C11D 17/0013* (2013.01); *C08K 3/36* (2013.01)

(56) References Cited

U.S. PATENT DOCUMENTS

| | | | |
|---|---|---|---|
| 7,741,265 B2 | 6/2010 | Iverson | |
| 7,745,383 B2 | 6/2010 | Dreja | |
| 8,227,394 B2 | 7/2012 | Zhu | |
| 9,926,518 B2 * | 3/2018 | Zhang | .................. C11D 3/3769 |
| 2003/0158076 A1 | 8/2003 | Rodrigues | |
| 2003/0216281 A1 | 11/2003 | DeLeo | |
| 2005/0148186 A1 | 7/2005 | Jung | |
| 2009/0107524 A1 * | 4/2009 | Gross | .................... C11D 3/124 |
| | | | 134/7 |
| 2012/0029141 A1 | 2/2012 | Jing | |

FOREIGN PATENT DOCUMENTS

| | | | |
|---|---|---|---|
| JP | 2009-269973 | 11/2009 | |
| WO | WO 2001-096511 | 12/2001 | |
| WO | WO 2002-045010 | 6/2002 | |
| WO | WO 2007-068870 | 6/2007 | |
| WO | WO 2007-068939 | 6/2007 | |
| WO | WO 2007-143344 | 12/2007 | |
| WO | WO 2010/114698 | * 10/2010 | .............. C09D 1/00 |
| WO | WO 2010-114698 | 10/2010 | |
| WO | WO 2011-008658 | 1/2011 | |
| WO | WO 2011-163175 | 12/2011 | |
| WO | WO 2015-116613 | 8/2015 | |
| WO | WO 2015-116616 | 8/2015 | |

OTHER PUBLICATIONS

International Search Report for the PCT International Application No. PCT/US2015/013164, dated Jun. 22, 2015, 3 pages.

* cited by examiner

AQUEOUS COMPOSITION SUITABLE FOR CLEANING AND PROTECTION COMPRISING SILICA NANOPARTICLES, COPOLYMER OF ACRYLAMIDE AND ACRYLIC ACID, NONIONIC AND ANIONIC SURFACTANT

CROSS REFERENCE TO RELATED APPLICATIONS

This application is a continuation of U.S. application Ser. No. 15/109,471, filed Jul. 1, 2016, issued as U.S. Pat. No. 9,926,518, which is a national stage filing under 35 U.S.C. 371 of PCT/US2015/013164, filed Jan. 28, 2015, which claims the benefit of U.S. Provisional Application No. 61/933,959, filed Jan. 31, 2014, the disclosures of which are incorporated by reference in their entirety herein.

SUMMARY

Presently described are compositions suitable for cleaning and providing long lasting protection from soil and stain accumulation. The composition comprises an aqueous liquid phase, silica nanoparticles, a water-soluble copolymer, a nonionic surfactant, and an anionic surfactant.

The water-soluble copolymer is a copolymer of acrylic acid and an acrylamide, or a salt thereof, wherein the acrylamide is represented by the formula wherein $R_4$ is H or methyl; and
$R_1$ and $R_2$ are independently selected from H; $C_1$-$C_3$ alkyl; or $R_3SO_3H$, wherein $R_3$ is alkylene having 2 to 6 carbon atoms;

The nonionic surfactant is present in an amount from 0.5 to 50 weight % solids. The anionic surfactant is present in an amount from 0.10 to 25 weight % solids.

In typical embodiments, the composition further comprise acid and has a pH value of less than or equal to 5.

DETAILED DESCRIPTION

Compositions according to the present disclosure comprise a water-soluble copolymer of acrylic acid and an acrylamide, or a salt thereof, silica nanoparticles, and a combination of surfactants dispersed in an aqueous (continuous) liquid phase.

The concentration of components (e.g. silica nanoparticles, water-soluble copolymer, surfactants) will be expressed herein as a weight percentage based on the weight of the solids. As used herein, "solids" refers to the total weight of the silica nanoparticles, water-soluble copolymer of acrylic acid and an acrylamide, and the surfactants. Since the weight percentage based on solids does not include the aqueous liquid phase, such weight percentage remains the same regardless of the dilution factor. Further, the weight percentage based on solids is also equivalent to the weight percentage of the dried protection coating that remains on the substrate or article after the composition has dried.

The aqueous liquid phase typically comprises at least 5 percent by weight of water and more typically 50, 60, 70, 80, or 90 percent by weight of water, or more. In some embodiments, the aqueous liquid phase is preferably essentially free of (that is, contains less than 0.1 percent by weight of based on the total weight of the aqueous liquid phase) organic solvents, especially volatile organic solvents. As used herein, "volatile organic solvent" refers to an organic solvent having a normal boiling point of 250° C. or less. However, non-volatile organic solvents may optionally be included in a minor amount if desired.

The cleaning and protection composition is typically formulated in a ready-to-use form comprising 0.5 to 5 weight % solids and 99.5 to 95 weight % aqueous liquid phase. The composition typically comprises the minimum amount of solid components that will provide the desired cleaning and protection performance. In some embodiments, the total amount of solids is at least 0.6, 0.7, 0.8, 0.9 or 1.0 weight %. In other embodiments, the total amount of solids is at least 1.1, 1.2, 1.3, 1.4 or 1.5 weight %. In yet other embodiments, the total amount of solids is at least 1.75, 2.0, or 2.5 weight %. In yet other embodiments, the composition may be provided as a concentrate that is further diluted prior to use. In this embodiment, the total amount of solids may be considerably greater, for example 50 weight %.

In some embodiments, the composition comprises at least one (e.g. anti-freeze) organic solvent for the purpose of depressing the freezing point below 0° C. Organic solvents include but are not limited to $C_1$-$C_6$ alkanols, and preferably $C_1$-$C_6$ diols and/or $C_3$-$C_{24}$ alkylene glycol ethers. $C_1$-$C_6$ alkanols include ethanol, ethanol, n-propanol, isopropyanol, butanol, pentanol, and hexanol, and isomers thereof. $C_1$-$C_6$ diols include methylene, ethylene, propylene and butylene glycols. $C_3$-$C_{24}$ alkylene glycol ethers include mono-, di-, and tri-ethylene (propylene) glycol ethers and diethers such as ethylene glycol monopropyl ether, ethylene glycol monobutyl ether (Butyl Cellosolve, Dow Chemical Company also referred to as "Dow"), ethylene glycol monohexyl ether (Hexyl Cellusolve, Dow), propylene glycol n-propyl ether, propylene glycol monobutyl ether, propylene glycol t-butyl ether, propylene glycol phenyl ether (Dowanol PPh, Dow), diethylene glycol monoethyl ether, diethylene glycol monopropyl ether (Eastman DP Solvent, Eastman Chemicals), diethylene glycol monobutyl ether (Dowanol DB, Dow), dipropylene glycol n-propyl ether (Dowanol DPnP, Dow), di propylene glycol n-butyl ether (Dowanol DPnB, Dow), triethylene glycol monomethyl ether (Methoxytriglycol, Dow), triethylene glycol monoethyl ether (ethoxytriglycol, Dow), triethylene glycol monobutyl ether (butoxytriglycol, Dow), tripropylene glycol methyl ether (Dowanol TPM, Dow), tripropylene glycol n-propyl ether (Dowanol TPnP, Dow) and tripropylene glycol n-butyl ether (Dowanol TPnB, Dow).

When present, the (e.g. alkylene glycol ether) organic solvents are preferably water-miscible or water-soluble at the concentration present. The kind and amount of such (e.g. alkylene glycol ether) organic solvents is selected such that the protection performance is not substantially reduced. When present the concentration of such solvents typically ranges from at least 0.25, 0.5, or 1 weight % to no greater than 5 or 10 weight % of the total aqueous composition, based on a reference composition comprising 97 weight % water. One of ordinary skill in the art can adjust the concentration of organic solvent for other dilution factors. For example, if the cleaning and protection solution is more concentrated, containing half as much liquid aqueous phase, the concentration of the organic solvent will be twice as much.

In order to achieve desirable long lasting protection properties, the composition comprises silica nanoparticles.

In some embodiments, the silica nanoparticles are "spherical", meaning having a spherical appearance, although minor amounts of flat spots and/or depressions may be present at the surface.

In order to minimize haze, the (e.g. spherical) silica nanoparticles preferably have a volume average particle diameter (that is, a $D_{50}$) of 60 nanometers (nm) or less. Preferably, the (e.g. spherical) silica particles have a volume average particle diameter in a range of from 0.5 to 60 nm, more preferably in a range of from 1 to 20 nm, and still more preferably in a range of from 2 to 10 nm. The silica nanoparticles may have any particle size distribution consistent with the above 60 nm volume average particle diameter; for example, the particle size distribution may be monomodal or polymodal.

Spherical silica particles in aqueous media (sols) are well known in the art and are available commercially; for example, as silica sols in water or aqueous alcohol solutions under the trade designations LUDOX from E. I. du Pont de Nemours and Co. of Wilmington, Del.), NYACOL from Nyacol Co. of Ashland, Mass. or NALCO from Nalco Chemical Co. of Naperville, Ill. One useful silica sol with a volume average particle size of 5 nm, a pH of 10.5, and a nominal solids content of 15 percent by weight, is available as NALCO 2326 from Nalco Chemical Co. Other useful commercially available silica sols include those available as NALCO 1115 and NALCO 1130 from Nalco Chemical Co., as REMASOL SP30 from Remet Corp. of Utica, N.Y., and as LUDOX SM from E. I. du Pont de Nemours and Co.

Non-aqueous spherical silica sols are spherical silica sol dispersions wherein the liquid phase is an organic solvent. Typically, the silica sol is chosen so that its liquid phase is compatible with the remaining components of the liquid phase. Typically, sodium-stabilized spherical silica particles should first be acidified prior to dilution with an organic solvent such as ethanol, as dilution prior to acidification may yield poor or non-uniform coatings. Ammonium-stabilized silica nanoparticles may generally be diluted and acidified in any order.

However, for uses wherein the transparency of the dried coating is of less importance, the silica nanoparticles may be non-spherical and/or may have a larger particle size, such as ranging up to 100, 200, or 300 nanometers. In this embodiment, natural and synthetic clay may be utilized as a source of the silica nanoparticles.

The silica nanoparticles may optionally comprise a surface treatment. However, in favored embodiments, the silica nanoparticles are free of surface treatment.

The cleaning and protection composition typically comprises silica nanoparticles in an amount ranging from 15 weight % to 90 weight % solids. In some embodiments, the composition comprises at least 20, 25, 30 or 35 weight % of silica nanoparticles. In other embodiments, the composition comprises at least 40, 45, 50, 60 or 65 weight % of silica nanoparticles. In yet other embodiments, the composition comprises at least 70, 75, or 80 weight % of silica nanoparticles. The protection performance generally increases as the concentration of silica nanoparticles increases.

The weight ratio of (e.g. spherical) silica nanoparticles to the water-soluble copolymer of acrylic acid and an acrylamide, or a salt thereof, is typically at least 50:50 or 60:40 or 70:30 and generally no greater than 97:3 or 95:5. In some embodiments, the weight ratio of (e.g. spherical) silica nanoparticles to the water-soluble copolymer of acrylic acid and an acrylamide ranges from 75:25 or 80:20 or 85:15 to 95:5.

In order to achieve desirable long lasting protection properties, compositions according to the present disclosure include a water-soluble copolymer. The water-soluble copolymer is a copolymer of acrylic acid and an acrylamide, or a salt thereof (that is, a salt of the copolymer), wherein the acrylamide is represented by the formula wherein $R_4$ is H or methyl; and
$R_1$ and $R_2$ are independently selected from H; $C_1$-$C_3$ alkyl; or $R_3SO_3H$, wherein $R_3$ is alkylene having from 2 to 6 carbon atoms (for example, ethylene, propylene, butylene, or hexylene). In some embodiments, $R_1$ and $R_2$ are both H. In some, embodiments, $R_1$ is H and $R_2$ is $R_3SO_3H$.

In typical embodiments, the copolymer typically has a weight ratio of acrylamide to acrylic acid in a range from 50:50 to 95:5. In some embodiments, the weight ratio of acrylamide to acrylic acid is at least 60:40 or 65:35. In some embodiments, the weight ratio of acrylamide to acrylic acid is at least 70:30 or 75:25 or 80:20 or 85:15.

The water-soluble copolymer of acrylic acid and an acrylamide, or a salt thereof, may be prepared by well known polymerization techniques from the corresponding monomers, optionally with an additional neutralization step, or from commercial sources.

In some embodiments, the copolymer can be represented by the structure wherein $R_1$ and $R_2$ are independently selected from H; $C_1$-$C_3$ alkyl; or $R_3SO_3H$, wherein $R_3$ is alkylene as previously described and $M^+$ is an alkali metal, such as sodium.

As evident from this structure, the cation ($M^+$) is generally associated with a polymerized unit or polymerized units derived from acrylic acid. Thus, the cation is not associated with the polymerized unit derived from the acrylamide. The polymerized acrylamide unit typically has a neutral charge and is not associated with a cation.

Examples of commercially available copolymers of acrylic acid and acrylamide, and salts thereof, include those available from Polysciences, Inc. of Wallington, Pa. or other suppliers under the trade designations: POLY(ACRYLAMIDE/ACRYLIC ACID) 90:10, NA SALT MW 200,000; POLY(ACRYLAMIDE/ACRYLIC ACID) 70:30, NA SALT MW 200,000; and POLY(ACRYLAMIDE/ACRYLIC ACID) 60:40, NA SALT MW>10,000,000. Additional examples include 2-propenoic acid, telomer with 2-methyl-2-[(1-oxo-2-propenyl)amino]-1-propanesulfonic acid monosodium salt and 2-propanol, sodium salt (CAS No. 130800-24-7) as available as AQUATREATAR-546 and sodium acrylate-sodium 2-acrylamido-2-methylpropanesulfonate copolymer (C.A.S. No. 37350-42-8) as available as AQUA-TREATAR-546 both from Alco Chemical of Chattanooga, Tenn. Another example includes copolymers of acrylic acid and acrylamide available from BASF Corporation, Florham Park, N.J. under the trade designation "LUREDUR", such as "LUREDUR AM NA".

In some embodiments, the weight average molecular weight (Mw) of the copolymer of acrylic acid and acrylamide, and salts thereof, is at least 25,000; 50,000; or 100;000 g/mole. In some embodiments, the molecular weight (Mw) of the copolymer of acrylic acid and acrylamide, and salts thereof, is at least 150,000; 200,000; or 250;000 g/mole. In some embodiments, the molecular weight of the copolymer of acrylic acid and acrylamide, and salts thereof, is no greater than 1,000,000; 750,000; or 500,000 g/mole.

The cleaning and protection composition typically comprises the water soluble copolymer of acrylic acid and acrylamide in an amount of at least 0.5, 1, 2, or 3 to 85 weight % solids. In some embodiments, the amount of water soluble copolymer of acrylic acid and acrylamide is at least 5, 5.5, 6, 6.5, 7 or 7.5 weight %. In some embodiments, the amount of water soluble copolymer of acrylic acid and acrylamide is no greater than 75, 70, 65, 60, 55, 50, 45, 40, 35, 30 or 25 weight %. In some embodiments, the amount of water soluble copolymer of acrylic acid and acrylamide is at least 8, 8.5 or 9 weight % and typically no greater than 20 or 15 weight %.

In some embodiments, the water-soluble copolymer of acrylic acid and acrylamide may have a low cationic (e.g. sodium) species, as described in US2012/0029141. This may be accomplished by contacting the composition with a protonated cation exchange resin (that is, wherein the cations have been exchanged with protons). Exemplary cation exchange resins include AMBERLITE IR-120 PLUS(H) from Dow Chemical Co. The ion exchange step may be carried out in a batch-wise or continuous process (for example, using an ion exchange column). In such embodiment, the water-soluble copolymer, i.e. prior to addition of surfactant, has a cation concentration (other than $H^+$ and $H_3O^+$) level of less than 100 parts per million by weight (ppm). In some embodiments, the water-soluble copolymer, i.e. prior to addition of surfactant, has a cation concentration of less than 90, 80, 70, or 60 ppm, based on a total weight of the composition.

In typical embodiments, the water-soluble copolymer of acrylic acid and acrylamide has not been subjected to cation exchange. Thus, the cation concentration is typically greater than 90 or 100 ppm based on the aqueous reference composition prior to addition of the surfactants.

The compositions according to the present disclosure preferably have a pH of less than 5, more preferably less than 4, and more still preferably less than 3. To facilitate handling, the compositions preferably have a pH of at least 1, more preferably at least 1.5 or 2. In some embodiments, for example, those involving an acid sensitive substrate, it may be preferable to adjust the pH to a value of from about 5 to about 7.5, although this may tend to degrade the appearance of the composition in some cases.

The compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, formic acid, propionic acid, benzenesulfonic acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. In some embodiments, the acid is an organic acid such as $CH_3OSO_3H$ (methane sulfonic acid) Combinations of organic and inorganic acids may also be used. Using weaker acids having a $pK_a$ of greater than 5 may not result in a uniform composition having the desirable properties such as transmissivity, cleanability and/or durability. In particular, compositions with weaker acids, or basic compositions, typically bead up on the surface of a polymeric substrate.

Compositions according to the present disclosure comprise a combination of at least one nonionic surfactant and at least one anionic surfactant. The term "surfactant" as used herein describes molecules with hydrophilic (polar) and hydrophobic (non-polar) segments on the same molecule, and which are capable of reducing the surface tension of the composition.

The kind and amount of surfactant is selected such that in combination with the copolymer of acrylic acid and acrylamide copolymer, the compositions are preferably stable when stored in the liquid form (120° F. for 90 days), for example, they do not gel, increase in opacity, form precipitated or agglomerated particulates, or otherwise deteriorate significantly.

Typically the aqueous cleaning and protection composition described herein comprises the minimum amount of surfactants that will provide the desired cleaning performance. When the kind and amount of surfactants are properly selected, the surfactants provide good cleaning (removal of soap scum on glass as described in the forthcoming examples) in combination with good protection performance (soap scum protection on glass as described in the forthcoming examples). In some favored embodiments, the composition has a cleaning rating of at least 7 or 8. In some favored embodiments, the percent of dried coating composition removed, after 5 cycles of the soap scum protection test, is less than or equal to 20% and in some embodiments no greater than 15%, 10%, or 5%. In some favored embodiments, the percent of dried coating composition removed after 6 cycles is less than or equal to 30% and in some embodiments no greater than 25%, 20%, 15%, 10%, or 5%. In some favored embodiments, the percent of dried coating composition removed after 7 cycles is less than or equal to 40% and in some embodiments no greater than 35%, 30%, 25%, 20%, 15% or 10%. In some favored embodiments, the percent of dried coating composition removed after 8 cycles is less than or equal to 45% and in some embodiments no greater than 40%, 35%, 30%, 25%, 20%, or 15%. In some embodiments, at least 50% of the dried coating composition is retained after 9, 10, 11, and 12 cycles.

Surfactants can be classified by the presence of formally charged groups in its head. The head of an ionic surfactant carries a net charge. A non-ionic surfactant has no charged groups in its head.

Surfactants can be characterized by various methodologies. One common characterization method, as known in the art, is the hydrophilic-lipophilic balance ("HLB"). Although various method have been described for determining the HLB of a compound, unless specified otherwise, as used herein HLB refers to the value obtained by the Griffin's method (See Griffin W C: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, Pa.).

According to Griffin's method:

HLB=20*Mh/M where Mh is the molecular mass of the hydrophilic portion of the molecule, and M is the molecular mass of the whole molecule. This computation provides a numerical result on a scale of 0 to 20, wherein "0" is highly lipophilic.

Griffin's method is typically used to calculate the HLB of a single molecule. However, various (e.g. commercially available) non-ionic surfactants comprise a mixture of molecules. When the surfactant comprises a mixture of molecules, the HLB can be calculated by the summation of the HLBs of the individual molecules multiplied by the weight fraction of each molecule.

The surfactants of the composition described herein are generally more hydrophilic than lipophilic, i.e., have an HLB of greater than 10. In favored embodiments, the HLB is at least 11 or 12 and no greater than about 19 or 18. In some favored embodiments, the composition comprises surfactants having an HLB of less than 17, or 16, or 15.

The molecular weight of the surfactants is typically at least 150 g/mole and generally no greater than 500 or 600 g/mole. In some embodiments, the molecular weight of the surfactant is at least 200 g/mole, 250 g/mole, or 300 g/mole.

The composition comprises at least one non-ionic surfactant. Nonionic surfactants have no ions and thus have no electric charge. Nonionic surfactants typically derive their polarity from having a (e.g. oxygen-rich) polar portion of the molecule at one end and a large organic molecule (e.g. alkyl or alkenyl group containing from 6 to 30 carbon atoms) at the other end. The oxygen component is usually derived from short polymers of ethylene oxide or propylene oxide. Nonionic surfactants include for example alkyl polysaccharides, amine oxides, fatty alcohol ethoxylates, alkyl phenol ethoxylates, and ethylene oxide/propylene oxide block copolymers. Some nonionic surfactants such as alkyl pyrrolidinone and ethylene glycol monohexyl ether also reduce streaking on (e.g. glass) surfaces. Various nonionic surfactants are commercially available such as from Huntsman under the trade designation "Surfonic".

In some embodiments, the composition comprises an alkyl polysaccharide nonionic surfactant. Alkyl polysaccharides generally have a hydrophobic group containing from 6 to 30 carbon atoms and a polysaccharide, e.g., a polyglycoside, hydrophilic group containing from 1.3 to 10 saccharide units. Alkylpolyglycosides may have the formula: $R^2O(C_nH_{2n}O)_t(glycosyl)_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 8. In some embodiments, $R^2$ is an alkyl group having 6 to 18 and more preferably 10 to 16 carbon atoms. The glycosyl may be derived from glucose. In some embodiments, the hydrogel cleaning concentrate may comprise a combination of an alkyl polyglycoside and alkyl pyrrolidone as described in WO2007/143344; incorporated herein by reference. Commercially available alkyl polysaccharides surfactant include "GLUCOPON" series non-ionic surfactants, commercially available from BASF Corporation such as a mixture of alkyl polyglycosides and cocoglucosides available under the trade designation "GLUCOPON 425 N" surfactant.

The cleaning and protection composition typically comprises (e.g. alkyl polysaccharide) nonionic surfactant in an amount ranging from 0.5 to 50% weight % solids. In some embodiments, the concentration of (e.g. alkyl polysaccharide) nonionic surfactant is at least 1, 1.5, 2, 2.5, 3, 3.5 or 5 weight %. In some embodiments, the concentration of (e.g. alkyl polysaccharide) nonionic surfactant is no greater than 45, 40, 35, 30, 25 or 20 weight %. In some embodiments, the concentration of (e.g. alkyl polysaccharide) nonionic surfactant is no greater than 15 or 10 weight %.

The composition further comprises an anionic surfactant. Without intending to be bound by theory, it is surmised than the anionic surfactant may stabilize the mixture of water-soluble copolymer and silica nanoparticles.

Anionic surfactants contain anionic (i.e. negatively charged) functional groups at their head, such as sulfate, sulfonate, phosphate, and carboxylates in combination with a positively charged counterion.

Suitable anionic surfactants are preferably $C_6$-$C_{18}$-alkylbenzenesulfonates, $C_6$-$C_{20}$-alkyl sulfonates, $C_6$-$C_{18}$-monoalkyl sulfates, $C_6$-$C_{18}$-alkyl polyglycol ether sulfates having from 2 to 6 ethylene oxide units (EO) in the ether moiety, and mono- and di-$C_6$-$C_{18}$-alkyl sulfosuccinates. In addition, it is also possible to use $C_6$-$C_{18}$-α-olefinsulfonates (also described as alphasulpho esters), sulfonated $C_6$-$C_{18}$ fatty acids, in particular dodecylbenzenesulfonate, $C_6$-$C_{22}$ carboxamide ether sulfates, $C_6$-$C_{18}$-alkyl polyglycol ether carboxylates, $C_6$-$C_{18}$ N-acyltaurides, $C_8$-$C_{18}$ N-sarcosinates and $C_6$-$C_{18}$-alkyl isethionates and mixtures thereof. Specific examples include dodecylbenzenesulfonate, dioctyl ester of sodium sulfosuccinic acid, and polyethoxylated alkyl ($C_{12}$) ether sulfate.

The anionic surfactants are typically in the form of sodium salts, but may also be present in the form of other alkali metal or alkaline earth metal salts, for example magnesium salts, and in the form of ammonium or mono-, di-, tri- or tetraalkylammonium salts, in the case of the sulfonates, the anionic surfactant may also in the form of their corresponding acid, for example dodecylbenzenesulfonic acid.

In some embodiments the anionic surfactant has the general formula $R^1OSO_3^-X^+$ wherein $R^1$ is a $C_8$-$C_{20}$ alkyl or alkenyl group and X is an alkali metal or alkaline earth metal such as sodium or potassium. One common aliphatic sulfate salt is depicted as follows:

The concentration of anionic surfactant typically ranges from 0.1 to 25 weight % solids. In some embodiments, the concentration of anionic surfactant is at least 0.2, 0.3, 0.4, 0.5, 0.6, 0.7, 0.8, 0.9 or 1 weight %. In some embodiments, the concentration of anionic surfactant is no greater than 20, 15, or 10 weight %. In some embodiments, the concentration of anionic surfactant is no greater than 9, 8, 7, 6, 5, or 4 weight %. In some embodiments, the concentration of anionic surfactant is no greater than 3 or 2 weight %.

Low concentrations of surfactant(s) in combination with high concentrations of aqueous liquid phase are amenable to low (surfactant) residuals remaining on the substrate or article after cleaning.

The weight ratio of nonionic surfactant to anionic surfactant can generally range from 1:10 to 10:1. In some embodiments, the weight ratio of nonionic surfactant to anionic surfactant is at least 1:1, 2:1, 3:1, 4:1, 5:1, 6:1, 7:1, 8:1 or 9:1.

The composition may optionally comprise silicone and fluorochemical surfactants such as these available under the trade designation FLUORAD from 3M Company of St. Paul, Minn. may also be used. However, in typical embodiments, the composition is free of silicone and/or fluorochemical surfactants. Further, the composition is typically free of cationic surfactant and/or amphoteric surfactants.

The composition may also optionally contain an antimicrobial agent. Many antimicrobial agents are commercially available. Examples include those available as: KATHON CG available from Rohm and Haas Co. of Philadelphia, Pa.; 1,3-dimethylol-5,5-dimethylhydantoin; 2-phenoxyethanol; methyl-p-hydrobenzoate; propyl-p-hydrobenzoate; alkyldimethylbenzylammonium chloride; and benzisothiazolinone.

The composition may also include various adjuvants as conventional for hard surface cleaners. Examples of such adjuvants include one or more of a fragrance, preservative, dyes, corrosion inhibitors, antioxidants and the like. Adjuvants are generally present in an amount less than 0.5 wt. % and preferably are present in an amount of about 100 ppm to about 0.25 wt. % of the composition.

Compositions according to the present disclosure may be made by any suitable mixing technique. One useful technique includes combining an aqueous solution of the water-soluble polymer of acrylic acid and an acrylamide, or a salt thereof, with an aqueous or solvent borne dispersion of spherical silica particles, aqueous surfactant, and then adjusting the pH to the final desired level.

In some embodiments, the transparent compositions are free of various impurities including, nonspherical silica particles, and added crosslinkers (for example, orthosilicates and/or silanol ethers). Accordingly, compositions according to the present disclosure may contain less than 0.1 weight percent or less than 0.01 weight percent of acicular silica particles, and, if desired, they may be free of acicular silica particles.

The compositions may optionally comprise a viscosity regulators including for example organic natural thickeners (agar-agar, carrageenan, tragacanth, gum Arabic, alginates, pectins, polyoses, guar, gu, locust bean gum, starch, dextrins, gelatin, casein), organically modified natural substances (carboxymethylcellulose and other cellulose ethers, hydroxyethyl-and-propylcellulose and the like, gum ethers), other water-soluble polymers (polyacrylic and polymethacrylic compounds, vinyl polymers, polyethers, polyimines, polyamides).

However in typically embodiments the described water-soluble copolymer of acrylic acid and an acrylamide is the sole water soluble polymer and the composition is free of other viscosity regulators such as organic natural thickeners.

Compositions according to the present disclosure are useful for cleaning and/or providing a protective coating a substrate. In typical uses the composition is utilized for the purpose of cleaning a substrate and concurrently provides the protective coating. However, the composition could also be employed for only one of such purpose.

Figure 1:
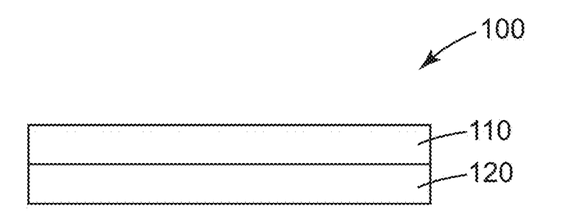
FIG. 1 is a schematic cross-sectional view of an exemplary article according to the present disclosure.

Referring now to FIG. 1, an article 100 comprises a substrate 120 having a layer 110 disposed thereon. Layer 110 is formed by applying a composition according to the present disclosure to a surface of a substrate and at least partially removing the aqueous liquid phase from the surface of a substrate.

Suitable substrates include various hard surfaces such as described in U.S. Pat. No. 6,955,834; incorporated herein by reference. Hard surfaces include for example, glass (for example, windows (including architectural and motor vehicle windows) and optical elements such as, for example, lenses and mirrors), ceramic (for example, ceramic tile), cement, stone, painted and/or clearcoat surfaces (for example, automobile or truck body or closure panels, boat surfaces, motorcycle parts, truck tractors, snowmobiles, jet skis, off-road vehicles, and tractor trailers), appliances, plastic protective films which are backed with pressure-sensitive adhesives, metal (for example, architectural columns, plumbing fixtures), fiberglass, thermosetting polymers, sheet molding compound, thermoplastics (for example, polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. Additional exemplary substrates include bathtubs, toilets, sinks, faucets, mirrors, windows, and white boards, such as described in WO2011/163175; incorporated herein by reference.

In some embodiments, compositions according to the present disclosure, when coated on a substrate and at least partially dried, provide improved cleanability by way of a reduced tendency to accumulate dirt and other contaminants, such as soap scum and hard water mineral deposits. By "cleanable" it is meant that compositions as described herein, after drying, provide a coating which is easier to clean by contacting with flowing water or a water spray to readily displace overlying contamination, thereby removing a substantial portion of the contamination from the coating. The water sheeting effect allows road spray, snow, slush dirt, soap scum, and staining minerals in rainwater and rinse water to substantially sheet out and run off the substrate surface, which significantly reduces the amount and the localized concentration of contaminants that are deposited after the water dries.

In some embodiments, the composition provides an abrasion resistant layer that helps protect the substrate from damage from causes such as scratches, abrasion and solvents.

When protection is desired (in the absence of cleaning) the compositions can be applied to a surface of an article using conventional coating techniques, such as brush, bar, roll, wipe, curtain, rotogravure, spray, or dip coating techniques. One method is to apply the composition using any suitable method and, after allowing a portion of the solvent to evaporate, to rinse off excess composition with a stream of water, while the substrate is still fully or substantially wetted with the composition.

In typical uses, the composition is utilized for both cleaning and protection. In this embodiment, the method generally comprises applying the composition to a surface of a substrate and at least partially removing the aqueous liquid phase from the surface of the substrate. For example, the compositions are suitable for use in a consumer "spray and wipe" application as a cleaning composition. In such an application, the consumer generally applies an effective amount of the composition using the pump and within a few moments thereafter, wipes off the treated area with a cloth, towel, or sponge, usually a disposable paper towel or sponge. Such application materials are preferably acid-resistant and may be hydrophilic or hydrophobic in nature, preferably hydrophilic.

In certain applications, however, especially where undesirable stain deposits are heavy, the cleaning composition may be left on the stained area until it has effectively loosened the stain deposits after which it may then be wiped off, rinsed off, or otherwise removed. For particularly heavy deposits of such undesired stains, multiple applications may also be used. Optionally, after the composition has remained on the surface for a period of time, it could be rinsed or wiped from the surface.

The composition described herein can also be applied to a hard surface by the use of a carrier substrate. One example of a useful carrier substrate is a wet wipe. The wipe can be of a woven or non-woven nature. Fabric substrates can include non-woven or woven pouches, sponges including both closed cell and open celled sponges, including sponges formed from celluloses as well as other polymeric material, as well as in the form of abrasive or nonabrasive cleaning pads. Such fabrics are known commercially in this field and are often referred to as wipes. Such substrates can be resin bonded, hydroentangled, thermally bonded, meltblown, needlepunched, or any combination of the former. The carrier substrate useful with the present inventive compositions may also be a wipe which includes a film forming substrate such as a water soluble polymer. Such self-supporting film substrates may be sandwiched between layers of fabric substrates and heat sealed to form a useful substrate.

The compositions of the present invention are advantageously absorbed onto the carrier substrate, i.e., a wipe to form a saturated wipe. The wipe can then be sealed individually in a pouch which can then be opened when needed or a multitude of wipes can be placed in a container for use on an as needed basis. The container, when closed, sufficiently sealed to prevent evaporation of any components from the compositions. In use, a wipe is removed from the container and then wiped across an area in need of treatment; in case of difficult to treat stains the wipe may be re-wiped across the area in need of treatment, or a plurality of saturated wipes may also be used.

Compositions according to the present disclosure are preferably applied to a substrate in a uniform average thickness varying from 50 to 5000 nanometers (nm), and more preferably less than 500 nm, in order to avoid visible interference color variations in the coated surface and/or hazy appearance, although other thicknesses may also be used.

The optimal average dry coating thickness is dependent upon the particular composition that is coated, but in general the average dry thickness of the composition is between 5 and 1000 nm, preferably 50 to 500 nm (for example, as estimated from atomic force microscopy and/or surface profilometry), although other thicknesses may be used. Above this range, the dry coating thickness variations typically cause optical interference effects, leading to visible iridescence (rainbow effect) of the dried coating which is particularly apparent on darker substrates. Below this range the dry coating thickness may be inadequate to confer sufficient durability for most substrates exposed to environmental wear.

After coating the surface of the substrate, the resultant article may be dried at ambient temperatures. Alternatively, the composition described herein may be dried at higher temperatures ranging from 100° F. to 250° F.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials

NALCO 1115 ("NP 1115") colloidal silica (4 nm volume average particle size, 16.5 weight %) was obtained from Nalco Company of Naperville, Ill.

POLY (ACRYLAMIDE/ACRYLIC ACID) 90:10, SODIUM SALT (MW=200,000 g/mole, 10% carboxyl) ("PAA") was obtained from Polysciences Inc. of Warrington, Pa., diluted with water to a 10 weight % solution.

GLUCOPON 425N, an aqueous solution of alkyl polyglucosides (approximately 50% actives, approximate molecular weight=488) based on a natural fatty alcohol $C_8$-$C_{16}$ (preserved with glutaraldehyde at approximately 0.012%), was obtained from BASF Corporation, Florham Park, N.J.

STEPANOLWA-EXTRA, an aqueous solution of sodium lauryl sulfate (approximately 29% actives, approximate molecular weight=288), was obtained from Stepan Company, Northfield, Ill.

LUTROPUR MSA, an aqueous solution of methane sulfonic acid (approximately 70% actives), was obtained from BASF Corporation, Florham Park, N.J., diluted with water to a 17.5 weight % solution.

CITRUS SZ 28421 citrus fragrance was obtained from Sozio Inc., Piscataway, N.J.

Test Methods

Soap Scum Test Method

A. Materials for Preparation of Soap Scum

Ivory bar soap (Procter and Gamble Co., Cincinnati, Ohio)
Synthetic sebum (Scientific Services S/D Inc., Sparrow Bush, N.Y.)
Color Me Happy Herbal Essence Shampoo (Procter and Gamble, Cincinnati, Ohio)
Color Me Happy Herbal Essence Conditioner (Procter and Gamble, Cincinnati, Ohio)
Calcium chloride dihydrate (Sigma-Aldrich, St. Louis, Mo.)
Magnesium nitrate hexahydrate (Sigma-Aldrich, St. Louis, Mo.)
Oleic acid (Sigma-Aldrich, St. Louis, Mo.)
Dust (ISO 12103-1, A2 Fines ID#10842F, Power Technology Inc., Burnsville, Minn.)

B. Preparation of Soap Scum

A 1000 g hard water solution comprising calcium chloride dehydrate (0.066% by weight) and magnesium nitrate hexahydrate (0.064% by weight) was first prepared. In a first vessel, crushed Ivory soap (1.99 g) was added into the aforementioned hard water solution (239.28 g) and the mixture was sonicated for 30 minutes at 60° C. Synthetic sebum (1.5 g) was then added into the mixture and the mixture was sonicated for another 10 minutes. In a second vessel, shampoo (1.99 g) was added into the aforementioned hard water solution (747.75 g) at 60° C. and the mixture was stirred for 15 seconds. Oleic acid (1.99 g) was then added into the mixture. The contents of both vessels were combined and stirred at 60° C. for 2 hours. Conditioner (5.00 g) was then added to the above combined mixture and was stirred at 41° C. for 15 minutes, followed by stirring at 45° C. for another 15 minutes. Finally, dirt (0.50 g) was added into the mixture and the mixture was stirred for 10 minutes.

C. Preparation of Glass Panels for Soap Scum Test

Approximately 0.3 g of the cleaning composition to be tested was coated using a rayon/polyester wipe (50/50, 40 grams/m² basis weight) onto a 4 inch (10.2 cm)×5 inch (12.7 cm) area of the surface of a 4 inch (10.2 cm)×6 inch (15.2 cm) glass panel. The coated panel was dried at room temperature for at least one hour before running soap scum tests.

D. Soap Scum Protection Test

A fixed amount of soap scum (10 sprays) was sprayed onto the entire coated surface of the glass panel and was air dried at room temperature for 3 minutes. The surface was then rinsed with running water and was air dried for another 7 minutes at room temperature. This was counted as 1 soap scum spray cycle. The water sheeting performance (hydrophilicity) of the surface was checked before any additional soap scum spray cycles were carried out. The amount of coating removed was estimated based on the percent surface area of the glass panel that appeared dry after a given spray cycle. The water sheeting performance was defined as 100% if no dryness was visually observed on the coated glass panel after 15 seconds when water was sprayed to cover the entire coated surface. As such, the percent of the coating removed during the cycle was defined as 0%. If the water sheeting performance was determined to be zero (glass panel appeared dry), the amount of coating removed during the cycle was defined as 100%, and no additional soap scum spray cycles were carried out. If the water sheeting performance was not zero soap scum spray cycles were repeated until the coated surface totally lost its water sheeting performance (zero hydrophilicity or 100% coating loss).

Cleaning Performance Test Method

The ability of the compositions to clean soap scum off of a glass substrate was evaluated as follows. A 4 inch (10.2 cm)×6 inch (15.2 cm) glass panel was coated with four layers of a soap scum solution (prepared as described above) and was dried at ambient temperature for 24 hours. About 0.1 gram of the cleaning composition to be tested was applied onto half of the soap scum coated glass panel (a 3 inch (7.6 cm)×(10.2 cm) section), and a clean wipe (rayon/polyester) was used to clean the section back and forth a total of four times. The clean appearance of the glass panel was rated from 1 to 10 with a rating of 10 indicating a perfectly clean glass surface and a rating of 1 indicating that essentially none of the soap scum coating was cleaned off of the glass surface. Two commercially available glass cleaners were also tested for comparison.

Sample Preparation

NP 1115 colloidal silica and aqueous solutions of PAA, surfactant and fragrance were combined with stirring and diluted with deionized water. The mixtures were acidified by the addition an aqueous solution of LUTROPUR MSA to the pH values as indicated in the Tables.

Examples E1-E4 and Comparative Examples CE1-CE3

Samples were prepared as described above having the compositions indicated in Table 1A and 1B. The material amounts for each example in the Tables are in grams. The first value is the amount of material added including any water if it was added as an aqueous solution (e.g., for CE2, 1.99 grams of a 10% aqueous solution of PAA was added). The values in parentheses are the weight in grams of the solid (e.g. active) material (in the absence of the aqueous liquid). The compositions were tested for soap scum performance and cleaning performance as described in the Soap Scum Protection Test and Cleaning Performance Test above. Test results are provided in Table 2.

TABLE 1A

|  | CE1 | CE2 | CE3 |
| --- | --- | --- | --- |
| NP 1115 | 10.82 (1.785) | 0 | 5.45 (0.899) |
| PAA | 0 | 1.99 (0.199) | 1.00 (0.100) |
| GLUCOPON 425N | 0.29 (0.145) | 0.29 (0.145) | 0 |
| STEPANOL WA-EXTRA | 0.10 (0.029) | 0.10 (0.029) | 0 |
| CITRUS SZ 28421 | 0.11 | 0.12 | 0 |
| LUTROPUR MSA | 2.10 (0.367) | 0.71 (0.124) | 1.05 (0.184) |
| DI Water | 186.59 | 196.87 | 92.54 |
| Total | 200.01 | 200.08 | 100.04 |
| Weight % total solids | 1.2 | 0.25 | 1.2 |
| pH | 2.37 | 2.44 | 2.34 |

TABLE 1B

|  | E1 | E2 | E3 | E4 |
| --- | --- | --- | --- | --- |
| NP 1115 | 10.84 (1.789) | 10.87 (1.793) | 5.43 (0.896) | 5.41 (0.893) |
| PAA | 2.01 (0.201) | 2.00 (0.200) | 1.02 (0.102) | 1.01 (0.101) |
| GLUCOPON 425N | 0.29 (0.145) | 0.58 (0.290) | 0.58 (0.290) | 2.32 (1.160) |
| STEPANOL WA-EXTRA | 0.10 (0.029) | 0.20 (0.058) | 0.20 (0.058) | 0.79 (0.229) |
| CITRUS SZ 28421 | 0.10 | 0.10 | 0.10 | 0.10 |
| LUTROPUR MSA | 2.08 (0.364) | 2.07 (0.362) | 1.08 (0.189) | 1.39 (0.243) |
| DI Water | 184.58 | 184.19 | 91.60 | 89.09 |
| Total | 200.00 | 200.02 | 100.01 | 100.11 |
| Weight % of NP 1115 silica nanoparticles in solution | 0.894 | 0.896 | 0.896 | 0.892 |
| Weight % of PAA in solution | 0.100 | 0.100 | 0.102 | 0.101 |
| Weight % 425N surfactant in solution | 0.0725 | 0.145 | 0.290 | 1.159 |
| Weight % WA-EXTRA surfactant in solution | 0.0145 | 0.029 | 0.058 | 0.229 |
| Weight % total surfactant in solution | 0.087 | 0.174 | 0.348 | 1.388 |
| Weight % solids NP 1115 silica nanoparticles | 82.671 | 76.591 | 66.568 | 37.474 |
| Weight % solids PAA water-soluble copolymer | 9.288 | 8.543 | 7.578 | 4.238 |
| Weight % solids 425N nonionic surfactant | 6.701 | 12.388 | 21.545 | 48.678 |
| Weight % solids WA-EXTRA anionic surfactant | 1.340 | 2.478 | 4.309 | 9.610 |
| Weight % solids total surfactant | 8.041 | 14.866 | 25.854 | 58.297 |
| GLUCOPON 425N:STEPANOL WA-EXTRA) ratio | 5:1 | 5:1 | 5:1 | 5:1 |
| NP 1115:PAA ratio | 9:1 | 9:1 | 9:1 | 9:1 |
| Weight % total solids | 1.3 | 1.4 | 1.5 | 2.6 |
| pH | 2.36 | 2.46 | 2.47 | 2.42 |

The weight % solids of Table 1B was determined by dividing the weight of a single component (e.g. 1.789 g in the case of the NP 1115 silica nanoparticles for E1) by the sum of the weight of the silica nanoparticles (1.789 g), water-soluble copolymer (0.201 g), and the surfactants (0.145+0.029) and multiplying by 100%.

TABLE 2

Soap Scum Protection Test

| Example | \% of Dried Coating Removed | | | | | | | | | | | | |
|---|---|---|---|---|---|---|---|---|---|---|---|---|
| Number of Cycles | | | | | | | | | | | | | |
| | 1 | 2 | 3 | 4 | 5 | 6 | 7 | 8 | 9 | 10 | 11 | 12 | 13 |
| CE1 | 10 | 15 | 40 | 80 | | | | | | | | | |
| CE2 | 0 | 5 | 15 | 30 | 70 | | | | | | | | |
| CE3 | 0 | 0 | 0 | 5 | 20 | 30 | 40 | 45 | 55 | 55 | | | |
| E1 | 0 | 0 | 0 | 5 | 5 | 5 | 10 | 15 | 20 | 20 | 30 | 45 | 55 |
| E2 | 0 | 0 | 5 | 10 | 10 | 20 | 30 | 35 | 60 | 65 | | | |
| E3 | 0 | 0 | 5 | 15 | 30 | 35 | 45 | 55 | | | | | |
| E4 | 0 | 5 | 10 | 20 | 45 | 60 | | | | | | | |

TABLE 3

| Example | Cleaning Performance Rating |
|---|---|
| CE3 | 7 |
| E1 | 8 |
| E3 | 8 |
| Commercial product A | 6 |
| Commercial product B | 5 |

What is claimed is:

1. A composition comprising:
an aqueous liquid phase;
15 to 90 weight% solids silica nanoparticles;
a water-soluble copolymer of acrylic acid and an acrylamide, or a salt thereof, wherein the acrylamide is represented by the formula wherein $R_4$ is H or methyl; and
$R_1$ and $R_2$ are independently selected from H; $C_1$-$C_3$ alkyl; or $R_3SO_3H$, wherein $R_3$ is alkylene having from 2 to 6 carbon atoms;
nonionic surfactant in an amount from 0.5 to 50 weight % solids; and
anionic surfactant in an amount from 0.10 to 25 weight % solids; and wherein the composition has a pH value of less than or equal to 5.

2. The composition of claim 1 wherein the water-soluble copolymer of acrylic acid and acrylamide has the general formula wherein $R_1$ and $R_2$ are independently selected from H; $C_1$-$C_3$ alkyl; or $R_3SO_3H$, wherein $R_3$ is alkylene having from 2 to 6 carbon atoms; $M^+$ is an alkali metal cation; and m and n are selected such that the water-soluble copolymer of acrylic acid and acrylamide, or salt thereof has a weight average molecular weight ranging from 35,000 to 1,000,000 g/mole.

3. The composition of claim 1 wherein the water-soluble copolymer has an alkali metal cation concentration of at least 90 or 100 ppm based on a total weight of the composition.

4. The composition of claim 1 wherein the water-soluble copolymer has a weight ratio of acrylamide to acrylic acid in a range of from 50:50 to 95:5.

5. The composition of claim 1 wherein the non-ionic surfactant is an alkyl saccharide.

6. The composition of claim 1 wherein the anionic surfactant is an alkyl sulfonate salt.

7. The composition of claim 1 wherein the water soluble polymer is present in an amount ranging from 0.5 to 85 weight % solids.

8. The composition of claim 1 wherein the silica nanoparticles have a volume average particle diameter of 60 nanometers or less.

9. The composition of claim 1 wherein the silica particles are spherical and the composition is free of acicular silica particles.

10. The composition of claim 1 wherein the composition is essentially free of volatile organic solvent.

11. A method of cleaning an article, the method comprising applying the composition of claim 1 to a surface of a substrate and at least partially removing the aqueous liquid phase from the surface of the substrate.

12. The method of claim 11 wherein the surface comprises at least one of glass, metal, or ceramic.

13. The method of claim 11 wherein the substrate is selected from the group consisting of shower surrounds, bathtubs, toilets, sinks, faucets, windows, and mirrors.

14. An article comprising the coating of claim 1.

* * * * *

UNITED STATES PATENT AND TRADEMARK OFFICE
CERTIFICATE OF CORRECTION

PATENT NO. : 10,273,435 B2
APPLICATION NO. : 15/898996
DATED : April 30, 2019
INVENTOR(S) : Yifan Zhang et al.

Page 1 of 1

It is certified that error appears in the above-identified patent and that said Letters Patent is hereby corrected as shown below:

In the Specification

Column 2,
Line 35, delete "isopropyanol," and insert -- isopropanol, --, therefor.
Line 43, delete "Cellusolve," and insert -- Cellosolve, --, therefor.
Line 50, delete "di propylene" and insert -- dipropylene --, therefor.
Line 56, delete "Dow)" and insert -- Dow), --, therefor.

Column 8,
Line 27, delete "N-acyltaurides," and insert -- N-acyltaurines, --, therefor.

Column 9,
Line 45, delete "guar, gu," and insert -- guar gum, --, therefor.

Column 12,
Line 19, delete "STEPANOLWA-EXTRA," and insert -- STEPANOL WA-EXTRA, --, therefor.

In the Claims

Column 16,
Line 15, in Claim 2, delete "M$^+$is" and insert -- M$^+$ is --, therefor.

Signed and Sealed this
Sixth Day of August, 2019

Andrei Iancu
*Director of the United States Patent and Trademark Office*